INVENTOR.
Jacques G. Mejean
BY Benj. T. Rauber
his ATTORNEY

Jan. 9, 1951            J. G. MEJEAN            2,537,475

CONTROL MECHANISM FOR ABSORPTION TYPE REFRIGERATORS

Filed April 22, 1949            8 Sheets-Sheet 4

INVENTOR.
Jacques G. Mejean
BY Benj. T. Rauber
his ATTORNEY

Jan. 9, 1951 J. G. MEJEAN 2,537,475
CONTROL MECHANISM FOR ABSORPTION TYPE REFRIGERATORS
Filed April 22, 1949 8 Sheets-Sheet 5

INVENTOR.
Jacques G. Mejean
BY Benj. T. Rauber
his ATTORNEY

Jan. 9, 1951 J. G. MEJEAN 2,537,475
CONTROL MECHANISM FOR ABSORPTION TYPE REFRIGERATORS
Filed April 22, 1949 8 Sheets-Sheet 6

INVENTOR.
Jacques G. Mejean
BY Benj. T. Pauler
his ATTORNEY

Jan. 9, 1951 J. G. MEJEAN 2,537,475
CONTROL MECHANISM FOR ABSORPTION TYPE REFRIGERATORS
Filed April 22, 1949 8 Sheets-Sheet 8

INVENTOR.
JACQUES G. MEJEAN
BY
Benj. T. Rauber
ATTORNEY

Patented Jan. 9, 1951

2,537,475

UNITED STATES PATENT OFFICE 2,537,475

CONTROL MECHANISM FOR ABSORPTION TYPE REFRIGERATORS

Jacques G. Mejean, Greenwich, Conn., assignor to The Aerotec Corporation, Greenwich, Conn., a corporation of Connecticut Application April 22, 1949, Serial No. 89,094

21 Claims. (Cl. 62—5)

My present invention relates to control mechanism for absorption type refrigerators.

In refrigerators of this type an aqueous solution of ammonia is heated during one cycle to drive the ammonia gas out of solution and into an evaporator in which it is condensed under pressure. In a succeeding cycle the generator is not heated and, as it cools, absorbs the ammonia vapors which then evaporate from the evaporator to produce a low temperature therein.

Normally the heating cycle is shorter than the evaporating cycle. The amount of cooling during the evaporating cycles depends upon the length of the heating or generating cycles, being greater the greater the length of the generating cycle and accordingly the amount of liquified ammonia in the evaporator. When a greater cooling effect is required, as for example, when the surrounding atmosphere is at a higher temperature, it is therefore necessary to lengthen the heating or generating cycle.

The aqueous solution of ammonia may be heated by any suitable fuel, as, for example, by gas or liquid fuels, which may be quickly supplied and ignited at the start of the cycle and promptly extinguished at the end thereof.

When liquid fuels, such as kerosene, are used, precaution must be taken to maintain a substantially constant supply during the heating period, to provide for a pilot light during the evaporating period or cycle, and to guard against overflow of the fuel because of failure of any control parts.

My present invention provides a simple and effective apparatus by which the timing of the cycles is controlled within limits by the temperature in the evaporator and in which the length of the heating period may also be controlled by the temperature of the atmosphere in which the apparatus is used. It also provides apparatus by which liquid fuel may be supplied and a pilot light maintained throughout the respective cycles without danger of overflow or loss of the liquid fuel.

In the apparatus of my invention the fuel control valve is controlled by a spring actuated mechanism movable past a position of dead center in one direction to close, and in the opposite direction to open or release, the valve. This spring actuated means may be of any suitable construction. An example is a spring so tensioned or confined between a valve moving lever and an operating lever that when the operating lever tilts from one position to the other it compresses or tensions the spring until it reaches a limiting position in either direction and then reacts to operate the valve moving lever with a toggle action. For this purpose a coil spring may be confined between one arm of a valve lever and an arm of an operating lever which swings past the arm of the valve lever to fixed stops.

The valve actuating mechanism is moved to valve release position by an expansible member, preferably a fluid expansible member, such as a bellows, connected to a bulb in the evaporator and containing a quantity of a volatile fluid, such as methyl chloride, to completely volatilize and expand the bellows at a temperature at, or above which the valve is to open, for example at about 27° F. A further rise in temperature, for example to 140° F., causes only a slight further increase in pressure. The expansion of the bellows moves the valve operating mechanism to release position through a suitable transmission. This transmission may comprise an arm moved by a stem on the free end of the bellows and acting on the operating lever to move it past dead center to release position. This starts the generating cycle.

As the valve actuating lever moves to valve release position, it also releases a clock which unwinds during the evaporating cycle and at the end of this cycle reverses the valve mechanism to close the valve. The clock is of a mechanically wound, self starting, type, such as is used in parking meters. As it unwinds, its winding stem rotates and, at the end of an interval corresponding to the evaporating cycle, engages the operating lever through a suitable transmission and moves it to closing position, thereby terminating the generating cycle.

The length of the generating cycle may be varied to correspond with changes in the atmospheric temperature. For this purpose the transmission from clock to valve actuating mechanism comprises an element sensitive to atmospheric temperatures, which varies the effective distance between the clock actuated part of the transmission and the part that it engages to move the valve mechanism. The temperature sensitive element may comprise any suitable type which moves or distorts with changes of temperature to change the position of one part of the transmission relative to the other. A suitable example is a bi-metallic strip attached to one part, as the clock operated part, and a series of spaced notches on a part of the operating lever of the valve mechanism one of which notches is engaged by the free end of the strip in different positions of deflection, the notches being spaced so as to be engaged at different positions of the clock mechanism.

The clock is wound during the evaporating cycle by a spring through a transmission which rotates the winding stem of the clock in winding direction to a fixed point and then slips free. The clock then remains wound until released to start the evaporation cycle. The clock winding spring is tensioned by the bellows during its expansion and, during the contraction of the bellows, is released to actuate the clock winding mechanism.

The valve mechanism may control the supply of either liquid or gaseous fuel. In controlling the supply of liquid fuel, it closes an inlet valve to a float chamber or releases it to the control of a float in the chamber, from which it is supplied to a wick or other type of burner for the generator. A constant level is maintained in the supply float chamber so as to provide a regular or uniform flow of fuel to the burner. An overflow chamber is provided to store a quantity of liquid fuel for a pilot light to which it is slowly supplied through a suitable duct, the size of this overflow chamber being amply sufficient to supply the pilot light throughout the evaporating cycle. A safety float is also provided, preferably in this overflow chamber, which releases a spring closure of the inlet valve in the event that the fuel level rises beyond a safe limit.

The various features of the invention are illustrated, by of example, in the accompanying drawings, in which.

Fuel feed mechanism

Figure 1:
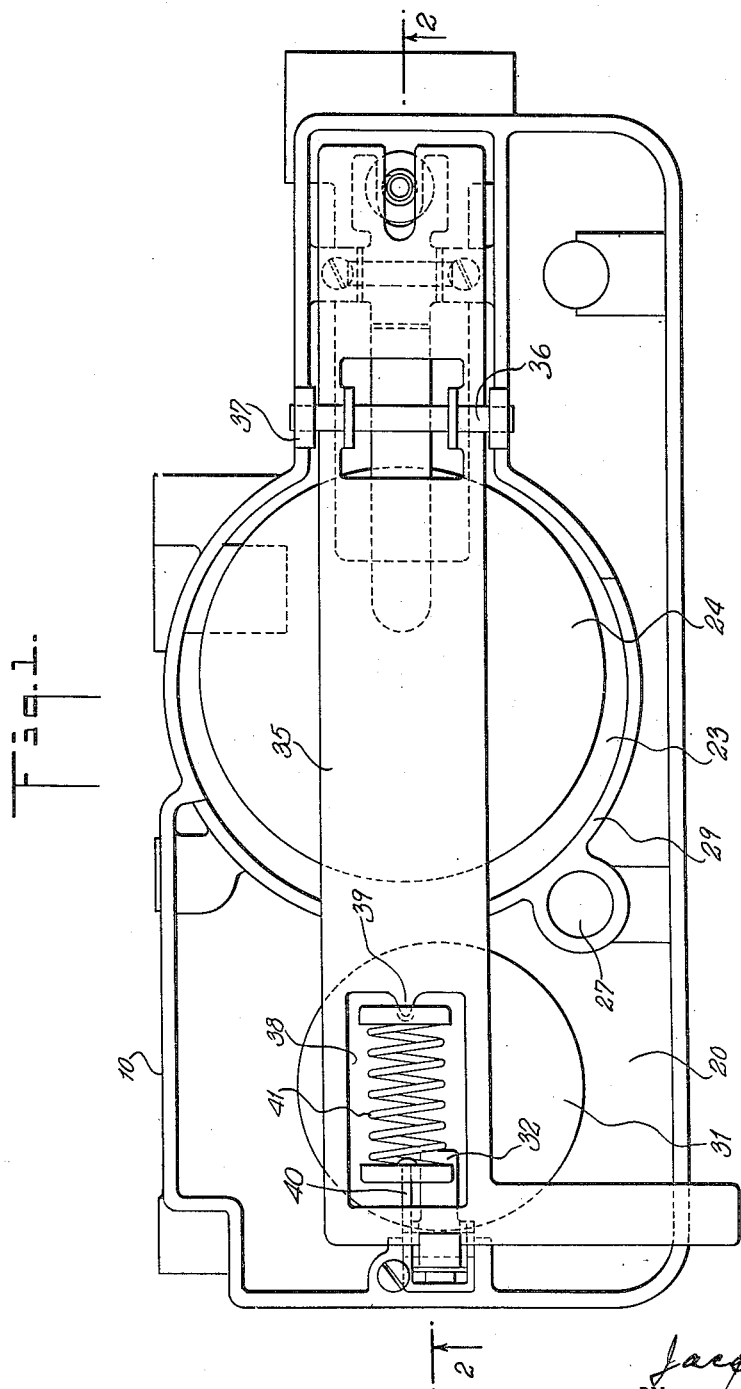
Fig. 1 is a plan of a constant level float chamber embodying elements of the invention.
Figure 2:
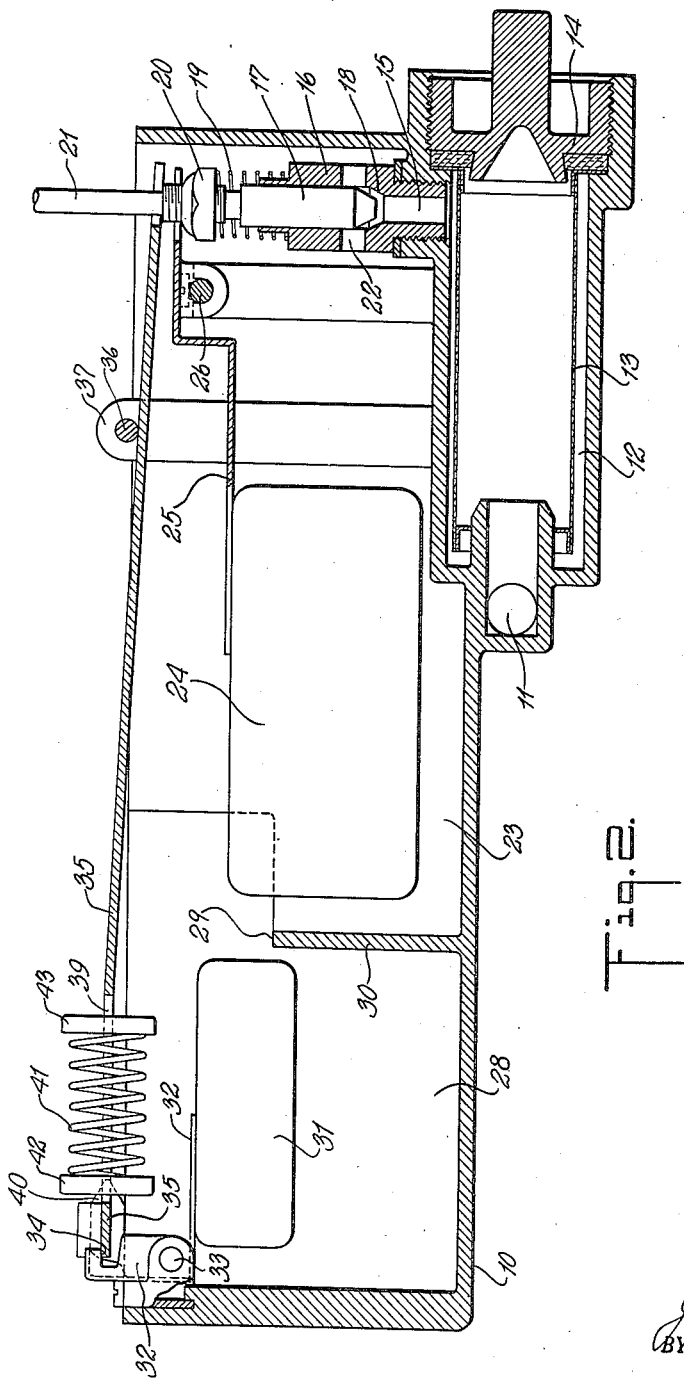
Fig. 2 is a vertical section of the chamber taken on line 2—2 of Fig. 1.

Referring more particularly to Figs. 1 and 2 of the drawings, a float chamber 10 is provided with an inlet opening 11 delivering to a strainer compartment 12 and into the interior of a cylindrical strainer or filter 13 which is sealed between the inlet 11 and a removable plug 14 screwed into the end of the strainer. The strainer removes particles of dirt that may be entrained in the fuel and is to be periodically removed and cleaned by removing the plug 14.

After passing through the strainer 13 the fuel enters the inlet port 15 of a float chamber 23. A vertically reciprocating valve 17 is provided to seat on a valve seat 18 and is normally opened by a spring 19 confined between the upper end of the valve chamber 16 and an adjustable nut or stop 20 on the stem 21 of the valve 17. Fuel passing upwardly through the valve seat 18 is admitted through side passages 22 to the float chamber 23 containing a control float 24.

The float 24 is mounted on a lever arm 25 pivoted at 26, the other arm of the lever bearing downwardly on the nut 20 so as to close the valve when the float 24 rises to a predetermined level. Fuel flows from float chamber 23 through an outlet passage 27, Fig. 1, leading to the generator burner.

The float chamber 23 is contained in or adjacent to a reserve chamber 28 into which the fuel may overflow over a weir 29 in a wall 30 separating the two chambers. The reserve chamber 28 is of a size to contain sufficient fuel for the pilot light during the evaporating cycle and this fuel is supplied during the evaporating cycle through any suitable port or duct, not shown. At the end of the evaporating cycle and when the chamber 23 is filled to its normal level the reserve chamber 28 is refilled.

Normally the float 24 will close the valve 17 whenever the fuel rises to the predetermined upper limit. In the event of failure of the valve 17 to be closed by the float 24, the fuel is prevented from overflowing the float chamber by means of a safety float 31 having an arm 32 pivoted at 33 to the side of the float chamber and notched as at 34 to receive the end of a lever 35 when the float is at the normal level but to release the lever when the fuel rises above the limit or tends to overflow the float chamber.

The lever 35 is pivoted on a pin 36 in ears 37 on the sides of the chamber 23 and extends to a position above the nut 20 of the valve 17. The lever is provided with an opening 38 near its latched end and at the end of the opening farthest from the latched end is provided with a pointed projection 39. Between the projection 39 and a pointed support 40 on the wall of the reserve chamber 28 near the arm 23 is a spring 41 confined between end plates 42 and 43 which are notched to receive the engaging points 39 and 40.

The spring 41 is normally compressed when the lever 35 is engaged by the float latch. When the end of the lever is released, however, the spring extends upwardly under pressure. This pressure is multiplied at the opposite end of the lever and exerted downwardly on the valve 17 to close it.

Cycle control

The float chamber 10 is mounted in the lower or bottom part of a casing or housing 44, in the upper part of which is mounted the control mechanism. This control mechanism comprises a clock 45 for timing the heating cycle and a bellows 46 which is secured at one end to the casing and is connected by suitable tubing to a bulb in the evaporator.

The clock 45 of the embodiment shown has a winding stem 47 which rotates at the rate of one complete revolution in twelve hours and, as the clock unwinds, therefore moves through an arc of 75° in 2½ hours, which is the normal maximum of the heating or generating cycle. The direction of winding is clockwise. At the end of the heating or generating cycle the clock is wound by a spring 48 adjacent to the bellows which is later released. At the end of the evaporating cycle the clock is started and unwinds during the next heating or generating cycle. During the period when the clock is being wound the stem 21 of the fuel control valve is depressed to hold the valve closed. When the clock is started the valve stem 21 is also released to permit the valve to open and fuel to be supplied to the generator until the clock reaches the end of its running period, the length of which is controlled by the atmospheric temperature. As the clock, in unwinding, reaches the end of this period it closes and holds the valve through a suitable transmission.

*Clock winding mechanism*

Figure 3:
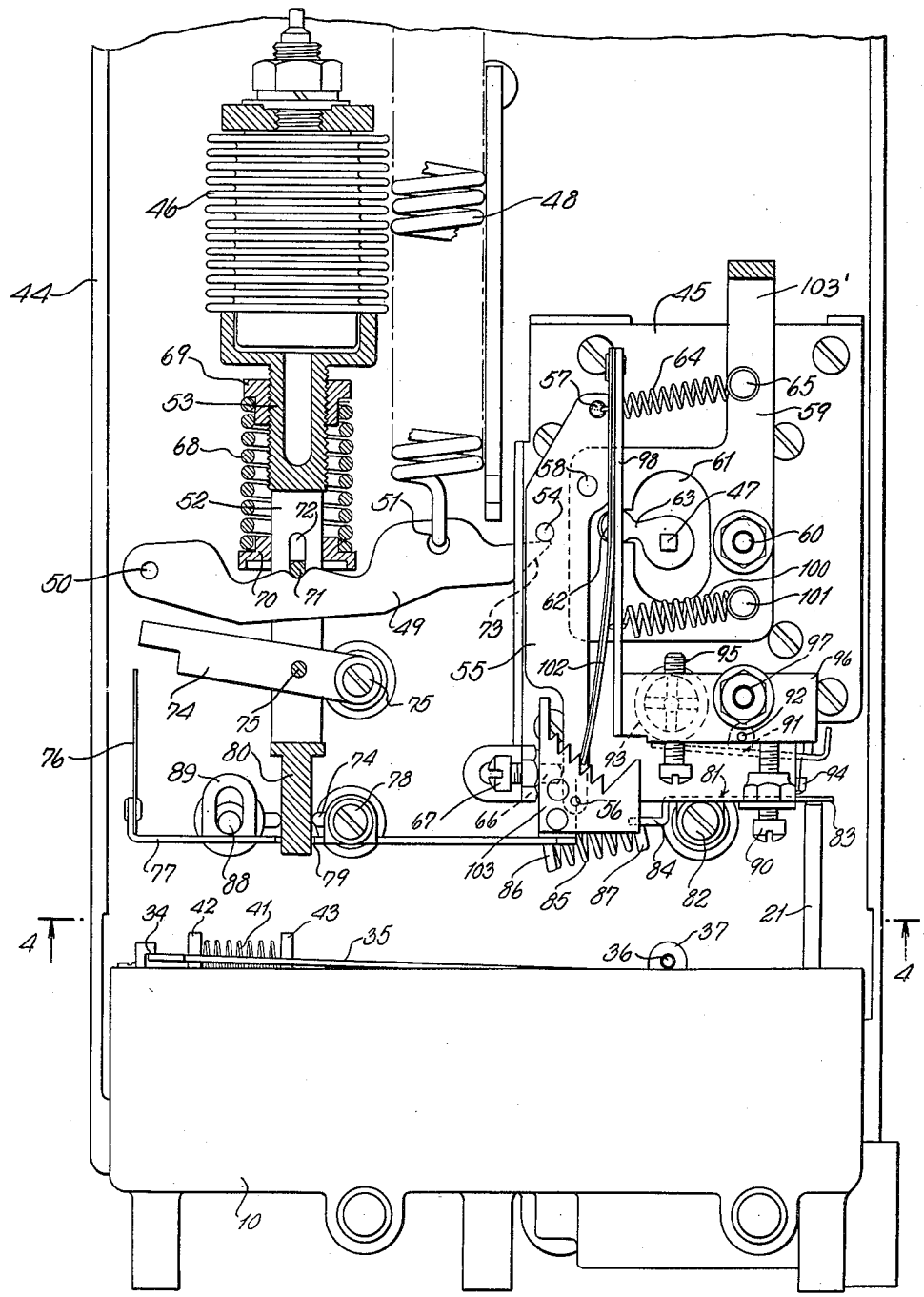
Fig. 3 is a vertical elevation of the float chamber and controlling mechanism, with the cover of the control mechanism removed and certain parts broken away to show certain elements more clearly.
Figure 4:
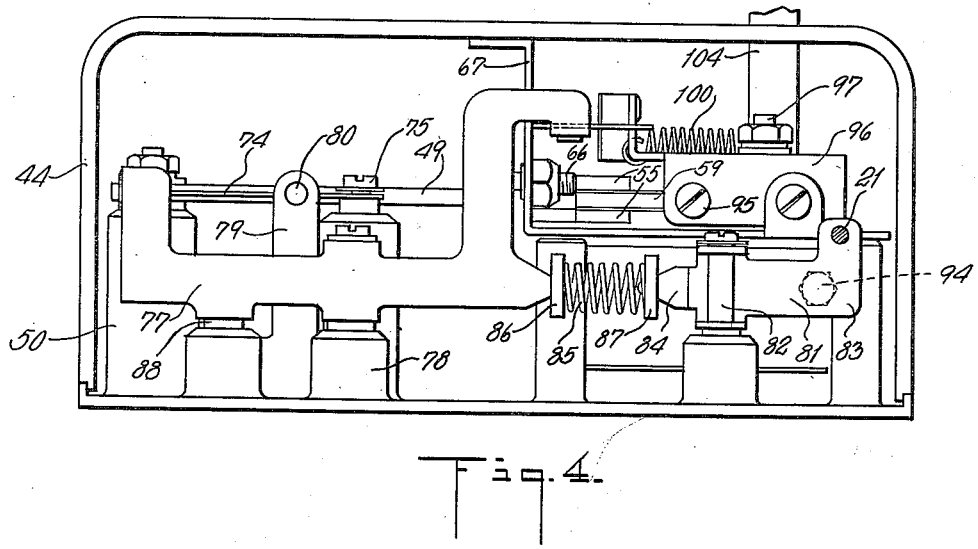
Fig. 4 is a horizontal section of the apparatus taken on line 4—4 of Fig. 3.
Figure 5:
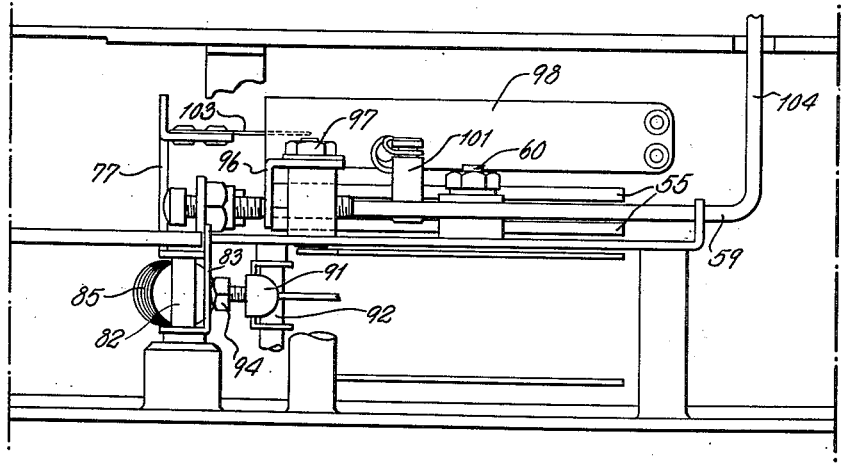
Fig. 5 is a side view of the apparatus taken from the right of Fig. 3.
Figure 6:
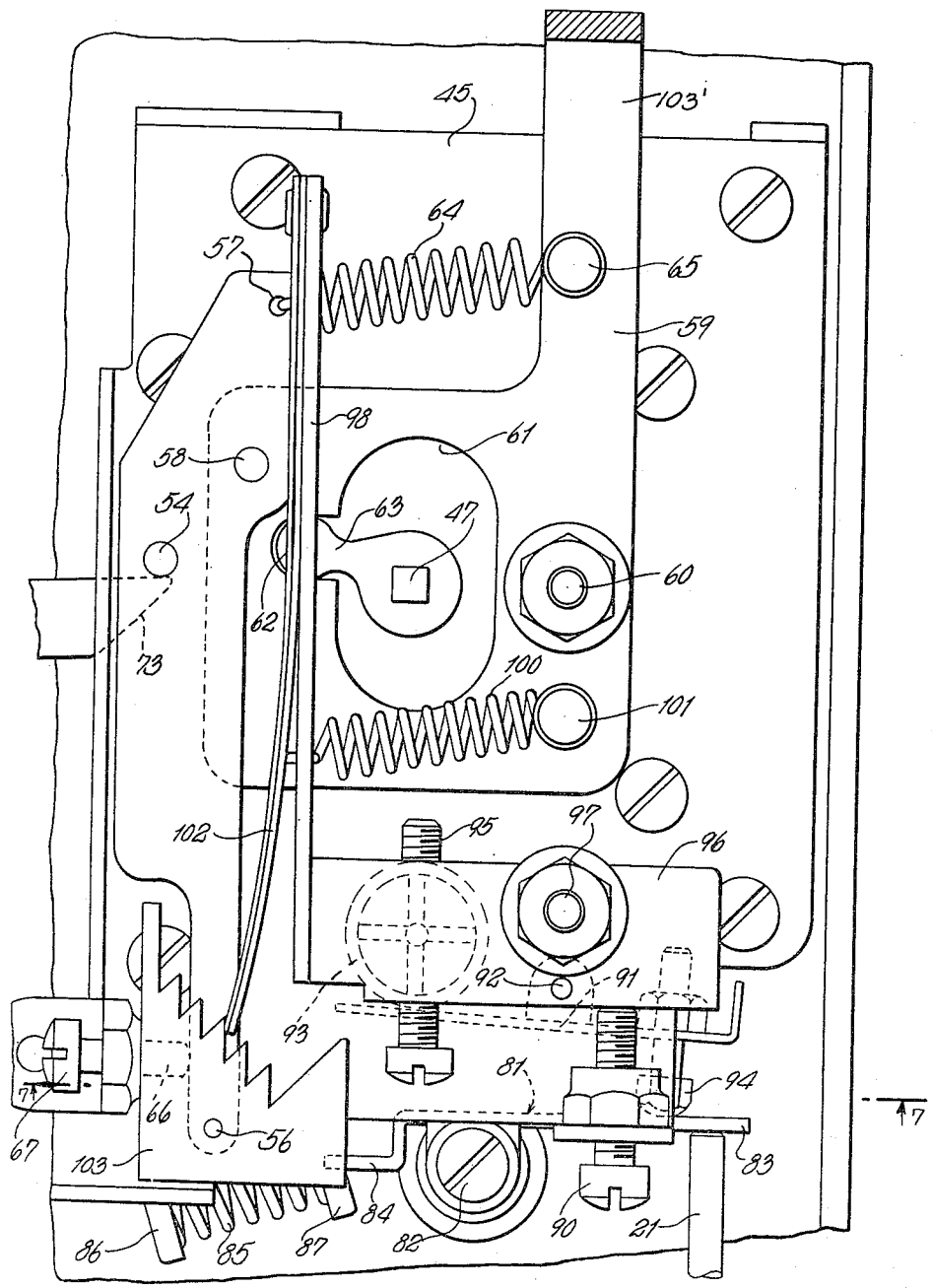
Fig. 6 is a detail elevation, on a larger scale, of the timing mechanism.

The clock winding mechanism is shown in full lines in Figs. 3 and 6 as it is being wound by the spring 48 through a transmission. This transmission comprises a lever 49, Figs. 3 and 4, pivoted on a pin 50 on the wall of the casing and having an opening 51 through which one end of the spring 48 is hooked, the other end of the spring being secured to the casing. The lever 49, which is also under the control of the bellows 46, extends through a slot 52 in a stem 53 secured to the free end of the bellows and thence beneath the spring 48 and terminates below a pin 54 secured in, and spanning a pair of spaced plates 55, Figs. 3, 5 and 6, which are also secured near their ends by pins 56 and 57 to form, in effect, a sliding rod. The plates 55 are pivotally secured by a pin 58 on a plate 59 which is pivotally supported on a stud 60 on the casing and extends between the plates 55. The plate 59 has an opening 61 notched at 62 to receive the free end of a crank arm 63 fixed on the clock winding stem 47 which is, for this purpose, squared. The relation of the plate 59 to the clock and to the plates 55 is such that, as the spring 48, acting through the lever 49, moves the plates 55 upwardly, they, in turn, rotate the plate 59 as a crank arm and the arm 63 clockwise to wind the clock.

At a definite point in the upward movement of the lever 49, its tip slips free of the pin 54, thereby limiting the winding of the clock and avoiding overwinding. For this purpose the plates 55 are pressed by a tension spring 64, secured at one end to the pin 57 and at the other to a pin 65 on the plate 59 against a stop screw 66 threaded on a bracket 67 secured to the casing 44. As the lever 49 and plate swing upwardly about their respective pivots, a point is reached at which the tip of the lever slips from beneath the pin 54 and the rewinding ceases. The point at which this occurs may be adjusted by adjusting the stop screw 66 to tilt the plates 55 about the pivot pin 58 toward or from the lever. During the rotation of the plate 59 in the opposite direction the plates 55 will slide on the stop screw 66 and rock slightly thereon as a pivot. After the clock has been wound it awaits the end of the evaporation cycle before starting to unwind.

*Fuel valve release*

At the end of the evaporation cycle the temperature in the evaporator rises to a point— generally about 27° F.—at which the methyl chloride vapor expands the bellows 46 thereby moving the free end of the bellows and the stem 53 downwardly. This downward movement is transmitted to a spring 68 encircling the stem 53 and confined between a collar 69 adjustably threaded on the stem 53 and a collar 70 slidable on the stem.

The pressure of the spring on the collar 70 is transmitted to a cross pin 71 carried by the collar and slidably mounted in a longitudinal slot 72 in the stem and thence to the upper edge of the lever 49 on which the pin bears. When the expansion of the bellow compresses the spring to a pressure equalling the tension of the spring 48, further expansion depresses the lever 49, which then tilts downwardly below the pin 54. The plates 55 may rock slightly to permit the tip of the lever to pass, the lower edge of the tip of the lever being inclined as at 73 to act as a cam against the pin 54 to displace the latter for this purpose.

As the stem 53 moves downwardly, it also tilts downwardly a trip arm 74 which pivots on a stud 75 on the casing, extends through the slot 52, and is pinned to the stem 53 by a cross pin 75. In its downward movement the arm 74 engages the end of a vertical leaf spring 76 extending upwardly from a horizontal operating lever 77 of the valve actuating mechanism and tilts it counterclockwise about a stud 78 on the casing. This tilting of the lever 77 acts to release the valve stem 21 and also starts the clock. Immediately above the lever 77 is a bracket 79 having a guide opening through which passes a reduced extension 80 of the bellows stem.

The other member of the spring actuated toggle comprises a short valve lever 81 pivoted on a horizontal stud 82. One arm 83 of this lever extends over the upper end of the valve stem 21 to depress it and close the valve 17 when tilted clockwise. The other arm 84 terminates a short distance from the end of the lever 77. In the space between the opposed ends of the levers a spring 85 is confined between a plate 86 pivoted on the end of the lever 77 and a plate 87 pivoted on the end of the lever arm 84.

In the position of the levers shown in Fig. 3, the end of the lever 77 is below the end of the lever arm 84 and the spring 85 tilts upwardly and, being compressed, acts to tilt the lever 81 clockwise and depress the valve stem 21. The levers remain in this position, holding the valve 17 closed, until the expansion of the bellows 46 at the end of the evaporating cycle lowers the stem 53 and tilts the lever 74 downwardly until it meets the upper edge of the spring extension 76 and tilts the lever 77 counter clockwise. As the opposite end of lever 77 rises above the level of the opposed end of the lever arm 84, the spring 85 tilts downwardly and reacts upwardly against the lever 77 to tilt it counter clockwise until a stud 88, mounted on the casing, stops a loop 89 mounted on the lever. The spring 85 then reacts downwardly on the end of the lever arm 84 and tilts the lever 81 counter clockwise until an adjustable stud 90 on the arm 83 is brought against the frame of the clock. The arm 83 is thereupon lifted from the stem 21, releasing the valve 17.

The valve 17 is thereupon under the control of the float 24 to maintain a constant supply of fuel to the burner of the generator during the generating cycle.

*Clock starting mechanism*

Figure 7:
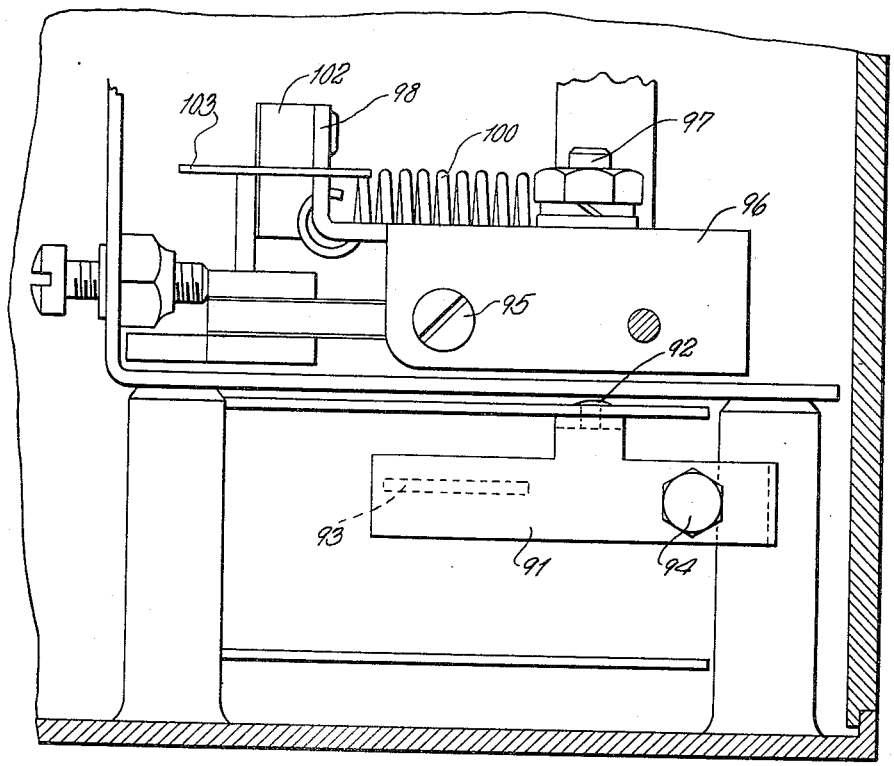
Fig. 7 is a section on line 7—7 of Fig. 6.

During the evaporating cycle, the clock is kept from unwinding by means of a lever 91 pivoted on a horizontal stud 92 on the frame of the clock 45 and weighted to tilt against and hold the balance wheel 93 of the clock. When the arm 83 of the lever 81 is tilted upwardly at the end of the evaporating cycle by the expansion of the bellows 46 acting through the stem 53, levers 74, and 77 and spring 85, it presses upwardly on a screw stud 94, Figs. 3, 5 and 7, on the lever 91, tilting the latter from contact with the balance wheel 93 and permitting the latter to unwind.

As the clock unwinds it rotates the arm 63 and the pivoted plate 59 counterclockwise. When the plate 59 has rotated through a predetermined angle, its lower edge makes contact with, and then depresses, an adjustable stop 95 on a lever 96 pivoted on a pin 97 and having an upwardly extending arm 98. The lever 96 is normally held against the stop 90 by a spring 100 tensioned between the arm 98 and a pin 101 on the plate 59. Further rotation of the plate 59 depresses the stop 95 and rotates the lever 96 counter clockwise and lowers the arm 98.

Secured to the upper end of the arm 98 is a bi-metallic strip 102 which bends toward or from the arm 98 as its temperature is increased or decreased respectively by the surrounding atmosphere. The lower end of the strip 102 is positioned to engage one of a number of stepped notches on a bracket 103 secured on the end of the lever 77 and thereby to rotate its end of the lever below the end of the lever arm 84. Thereupon the position of the spring 85 is reversed, and the lever 81 rotates clockwise, depressing the valve stem 21 and permitting the lever 91 to stop the clock. This terminates the heating cycle. The stepped notches of the bracket 103 are so positioned as to be engaged earlier as the strip bends outwardly and accordingly as the temperature of the atmosphere is lower and, reversely, at a later point as the atmospheric temperature increases.

During the evaporation cycle the bellows 46 contracts, drawing the levers 74 and 74 upwardly, the spring 76 bending to permit the end of the lever 74 to rise, and permitting the spring 48 to rewind the clock. The cycles may then repeat.

The plate 59 has an arm 104 bent to extend through an opening in the cover of the case whereby the plate may be rotated and the clock wound to start the apparatus.

While the apparatus has been described as applied to a liquid fuel fired generator it may be used with gaseous fuel in which case the lever arm 83 may operate a gas valve.

Résumé

To start the apparatus, the arm 104 of the plate lever 59 is moved in a clockwise direction, rotating the plate lever 59 clockwise. This rotates the arm 63 to wind the clock and lifts the edge of the plate from the stud 95 on lever 96. The bellows 46, being at ordinary atmospheric temperature, expands. This has two effects: to lower the lever 49 through the spring 68, the tip of the lever displacing and sliding beneath the pin 54, and to tilt the operating lever 74 of the valve control until it engages the upper edge of the leaf spring 76 and depresses it, tilting the lever 77 counter clockwise until its opposite arm rises above the opposed end of the valve actuating lever arm 84. The spring 85, which has been compressed, reacts upwardly against the lever 77, rocking it until stopped by the pin and loop 88 and moving the leaf spring 76 away from the lever 74. The spring 85 then reacts downwardly on the lever arm 84, rotating the lever 81 counter clockwise. The opposite arm 83 is thereupon lifted from the valve stem 21, releasing or opening the valve 17 or an equivalent gas control valve. The lifting of arm 83, acting through stud 94 also lifts the weighted lever 91 from the balance wheel 93, releasing the clock. The heating cycle now begins.

As the clock unwinds, it rotates the plate lever 59 counter clockwise until its lower edge rests on and then lowers the stud 95 on the lever 96 and rocks this lever counter clockwise. The bi-metallic strip 102 on the vertical extension 98 of the lever 96 is thereby lowered to engage one of the notches of the bracket 103 of the lever 77 and rotate this lever clockwise until the end of its right arm is below the level of the arm 84. The position of the spring 85 is now reversed, throwing the lever 77 in the opposite direction against the stop 88 and then pushing the lever arm 84 upwardly. The arm 83 then pushes downwardly on the valve stem 21, closing the valve 17 and releasing the weighted lever 91 to stop the clock. The heating cycle is now terminated.

The bellows 46 now contracts as the evaporator cools, drawing the stem 53 upwardly. This lifts the arm 74, which displaces, and moves past, the leaf spring 76. It also releases the lever 49 which is thereupon drawn upwardly by the spring 48. The lever 49 engages the pin 54, lifting the sliding plates or rods 55 and pin 52, which in turn, rotates the plate lever 59 clockwise to wind the clock. At the end of the evaporating cycle the bellows 46 expands and the cycles repeat.

It will be apparent that the form and positions of the various elements—the plate lever, the plates or rod 55, the thermo expansible element 102 and the valve actuating elements 77—90, for example—may be altered or changed within the scope of the invention and that the forms shown are merely by way of example.

Figure 8:
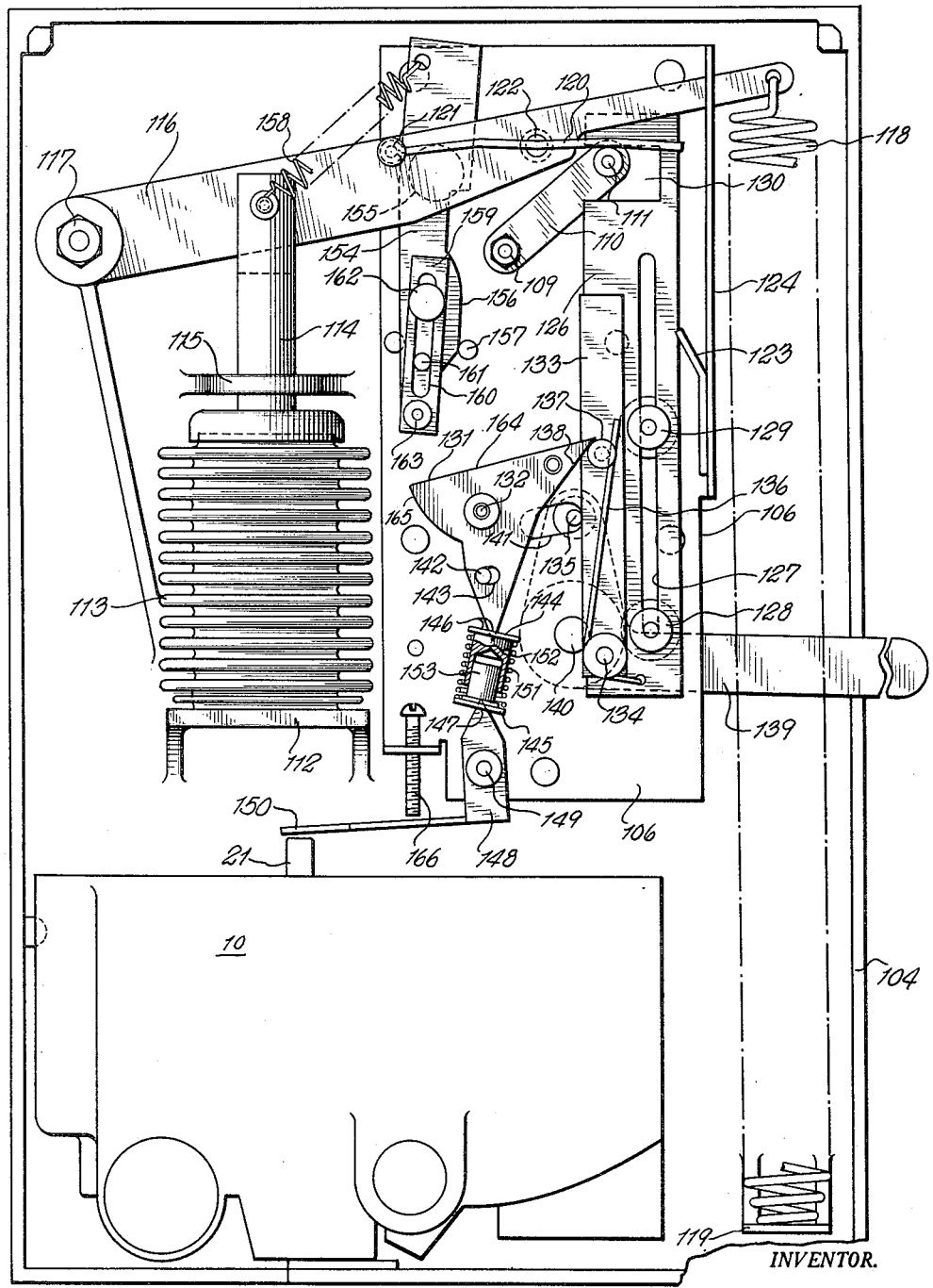
Fig. 8 is an elevation.
Figure 9:
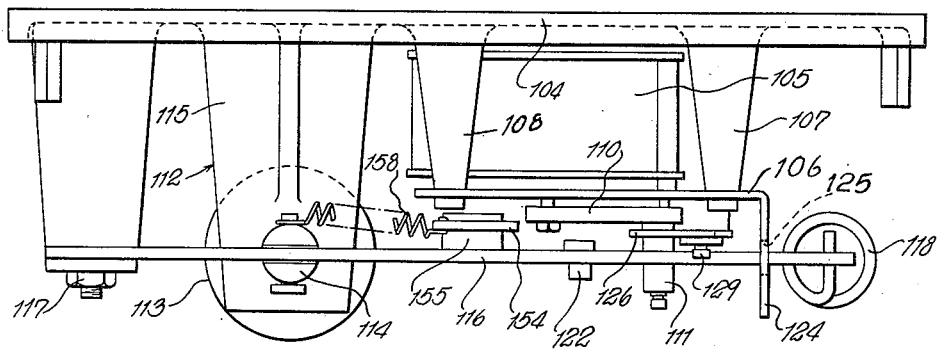
Fig. 9 a plan, and Fig. 10 a side view from the right of Fig. 8 of a modified form of embodiment of the invention, the parts being shown as attached to a base wall, and the cover being removed.
Figure 10:
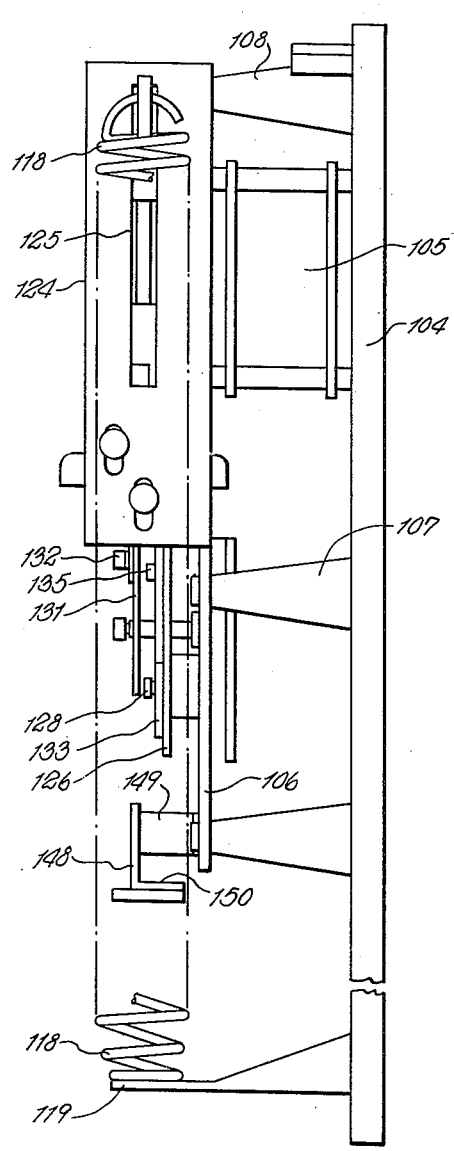

Modification of Figs. 8, 9 and 10

In this modification the arrangement of the control mechanism relative to the fuel shut-off and release device 10 may be substantially similar to that of the above described embodiment, the fuel shut-off mechanism being mounted on the lower part of a base or support 104, the control mechanism being also mounted on this base above the fuel shut-off mechanism.

A clock mechanism 105, Figs. 9 and 10, is mounted directly on the base 104. Immediately in front of the clock mechanism is a supporting plate 106 mounted on the base 104 and spaced therefrom by posts 107 and 108.

The clock mechanism is provided with a stem 109 projecting through the plate 106 and having a winding arm 110 above the plate. The free end of the winding arm carries a pin 111 projecting forwardly from the arm 110, Figs. 8 and 9.

Mounted on the base 104 by means of a suitable bracket 112 is an expansible bellows 113 which expands at the end of the cooling cycle to permit the evaporating cycle to begin. This bellows contracts during the cooling cycle and releases a spring to wind the clock mechanism.

During the expansion of the bellows 113 it moves upwardly a stem 114 guided in a bracket 115 to tilt upwardly an actuating lever 116 pivoted on a pin 117 on the base 104. The opposite end of the lever is connected to a coil spring 118, the other end of which is fixed on a bracket 119 mounted on the base 104.

As the bellows expands and tilts the lever 116 upwardly it stretches and puts under tension the spring 118. During this period the clock mechanism is released and the winding arm 110 permitted to unwind in a counterclockwise direction, as shown in Fig. 8.

When the bellows 113 contracts the tension of the spring 118 pulls the lever 116 downwardly. A leaf spring 120 mounted on the lever 116 by means of pins 121 and 122 thereupon engages the pin 111 on the clock winding arm 110 and moves this arm in a clockwise direction thereby winding the clock. The spring 120 moves downwardly until it engages a stop 123 on a flange 124 extending outwardly from the plate 106. The flange is provided with a slot 125 through which the lever arm 116 extends. The arm 116 may continue downwardly a short distance after the spring engages the stop 123 until it reaches the bottom of the slot 125. The stop 123 thereby determines the end of the clock winding period. The clock is then held in wound condition until the bellows 113 again expands, raising the lever 116, whereupon the clock will unwind throughout the evaporating cycle.

As the clock winding arm 110 springs upwardly and reaches its uppermost position it actuates a mechanism to move the fuel control device to closed position thereby terminating the evaporating cycle. For this purpose the movement of the arm is transmitted to a sliding plate 126 which has a slot 127 through which passes a pair of retaining studs 128 and 129 on the plate 106 and spaced to permit a limited vertical movement of the plate 126. This plate is notched at 130 to receive the pin 111 of the clock winding arm 110 so that the plate is lowered when the clock winding arm swings downwardly through the clock winding cycle and moves upwardly as the arm swings upwardly during the unwinding of the clock mechanism.

The plate 126 carries mechanism which serves to engage and rotate counterclockwise a cam plate 131 pivoted on a pin 132 on the supporting plate 106, serving, when moved counterclockwise, to close the fuel supply mechanism through a spring toggle mechanism.

In Fig. 8 the mechanism is shown as it has rotated the cam plate 131 to closing position. For this purpose there is mounted on the sliding plate 126 a strip 133 pivoted on the plate by means of a pin 134 to slide with the plate and pressed against an adjustable pin 135 by means of a spring 136 which is fixed to the plate 126 at one end and at its opposite end bears against a pin 137 on the strip 133. The pin 137 in turn bears against an inclined edge 138 of the cam plate 131 serving to rotate this plate counterclockwise toward the end of the upper movement of the plate 126 and strip 133.

The pin 135 is carried on an angled lever 139 extending outwardly beyond the base 104 and pivoted at 140 so that by shifting the lever 139 the pin 135 may be adjusted toward or from the plate 126 through the arc of a slot 141 through which the pin 136 projects.

It will be apparent that when the lever 139 is adjusted to place the pin 135 in different positions and thereby change the position of the strip 133, the pin 137 on the latter will engage the edge 134 of the plate 131 earlier or later, as the case may be, in its upward movement.

The movement of the cam plate 131 is limited by means of a pin 142 mounted on the plate 106 and extending through a slot 143 of the cam plate 131. When the cam plate is swung counterclockwise to the limit of its movement further upward movement of the plate 126 will only serve to swing the strip 133 relatively clockwise against the pressure of the spring 136.

The adjustment of the lever 139, therefore, serves to adjust the point in the upward movement of the plate 126 and of the lever 116 at which cam plate 131 will be swung counterclockwise.

In Fig. 8 the cam plate 131 is shown at the upper limit of its counterclockwise movement in which position it has swung the fuel valve control mechanism to closed position.

The valve operating mechanism comprises a pair of plates 144 and 145 confined between a downwardly pointing end 146 of the cam plate 131 and an opposite upwardly pointing end 147 of a right-angle lever 148 pivoted at 149 on the plate 106. The lever 148 has a longer arm 150 extending to a position above the valve stem 21 so as to close the valve when the lever swings counterclockwise, and release it when it swings clockwise.

The two plates 144—145 are movable toward and away from each other under the influence of a coil spring 151 confined between the plates, and are guided in their movements by telescoping guide stems 152 and 153. The positions of the elements of the assembly are such that as the cam plate 131 swings to its extreme clockwise or counterclockwise position the point 146 moves through alignment with the pivot 149 and the point 147, being in dead center with the spring 151 at the point of alignment. And as it moves past this point the spring acts to push the point 147 in the opposite direction.

Having moved the lever 148 to the position shown in Fig. 8, the evaporating or heating cycle is terminated and the cooling cycle then begins. As the refrigerant cools the bellows 113 contracts tilting the lever 116 counterclockwise and rewinding the clock. At the same time a mechanism is set to tilt the cam plate 131 in the opposite direction to release the valve stem 21 at the end of the cooling cycle.

This setting apparatus comprises a bar 154 pivoted by means of a pin 155 on the lever 116 and depending therefrom. The depending portion of the bar 154 has a cam surface 156 bearing against the pin 157 on the plate 106 and is yieldingly held in contact with the pin 157 by a coil spring 158 tensioned between the upper part of the bar 154 and a pin on the lever 116.

The depending part of the bar 154 also carries a plate 159 having a slot 160 through which passes a guide pin 161 on the bar and a securing screw 162 so that the plate 159 may be adjusted vertically relative to the bar.

The plate 159 also carries a roller 163 so positioned that in the downward movement of the lever 116 and bar 154 the roller contacts with and is deflected by an upper inclined edge 164 of the cam plate 131, thus swinging the bar 154 against the action of the spring 158 until the roller 163 has cleared the end of the inclined edge 164 and comes against a curved cam edge 165 against which it is pressed by the action of the spring 158.

The position of the plate 159 may be adjusted to engage the edges 164 and 165 at a selected position of the lever 116.

The roller 163 will remain against the cam edge 165 throughout the cooling cycle, but at the end of this cycle when the bellows 113 expands tilting the lever 116 and raising the bar 154 the roller 163 acting against the cam edge 165 will cause the cam plate 131 to rotate clockwise and throw the point 146 to the opposite side of the center line of the pivot 149 and point 147. Thereupon the pressure of the spring 151 will rotate the lever 148 clockwise until the arm 159 strikes and is held by a stop screw 166 on the plate 106.

In this modification the length of the evaporating or heating cycle may readily be controlled by an adjustment of the control lever 139. The temperature at which the heating or evaporating cycle begins may be controlled by adjusting the plate 159 on the bar 154.

It will be evident that this modification may also be used to control either a liquid fuel valve or a gas valve.

What I claim is:

1. Control mechanism for absorption refrigerators which comprises a fuel control valve, spring actuated means movable past dead center in one direction to close, and in the opposite direction to release, said fuel valve, an expansible thermal element to move said actuated means to valve-release position, a clock having a winding and unwinding shaft, a transmission from said shaft to said spring actuated means to move said spring actuating means to valve closing position as said shaft unwinds, and means released by the expansible thermal element to wind said shaft.

2. The control mechanism of claim 1 in which said transmission comprises a thermal element responsive to atmospheric temperatures to engage said spring actuated means at different positions of said clock shaft.

3. Control mechanism for absorption refrigerators which comprises a fuel control valve, spring actuated means movable past dead center in one direction to close, and in the opposite direction to release, said fuel valve, an expansible thermal element to move said actuated means to valve-release position, a clock having a winding and unwinding shaft and a transmission from said shaft to said spring actuated means to move said spring actuated means to valve closing position, and a clock winding spring tensioned by the expansion, and released by the contraction, of said expansible thermal element.

4. The control mechanism of claim 1 in which said spring actuated means comprises a valve actuating lever, a driving lever, said levers having opposed arms movable past a position of alignment and a spring tensioned between said arms.

5. Control mechanism for absorption refrigerators which comprises a fuel control valve, a spring toggle movable to valve-opening and to valve-closing positions, a clock having a winding and unwinding shaft, a transmission from said shaft to said toggle to move said toggle to valve-closing position as said shaft unwinds and an expansible thermal element to move said toggle to valve-opening position, and winding means released by the contraction of said expansible thermal element to wind said shaft.

6. The control mechanism of claim 5 in which said transmission comprises a thermal element responsive to atmospheric temperatures to engage said toggle at a variable point in the unwinding of said clock shaft.

7. The control mechanism of claim 5 in which said transmission comprises a release mechanism to release said toggle from said transmission when said toggle is in valve-opening position.

8. The control mechanism of claim 5 which comprises means actuated by said toggle in valve-opening position to release said clock for starting.

9. The control mechanism of claim 5 in which said spring toggle comprises spring actuated means movable past dead center in one direction to close and in the other direction to release said fuel valve.

10. A control mechanism for absorption refrigerators which comprises a clock having a winding arm, a winding plate engaged by said arm and pivoted to swing on a center spaced from that from said arm, a sliding plate having a pivotal engagement to said winding plate, a lever to engage and move said sliding plate to winding position, a spring actuating said lever toward winding position, a thermal expansible bellows having a stem engaging said lever to move said lever against the action of said spring when said bellows expands, a fuel shut-off valve, a spring toggle to move said shut-off valve to closed position and to release position, said spring toggle comprising a pair of levers having arms that swing past a position of alignment, and a spring between said arms tensioned to be compressed when said arms are in position of alignment, one of said levers of said spring toggle acting to close or to release said valve, the other of said levers being actuated and moved by said expansible bellows, transmission from said clock mechanism to said spring toggle to move said toggle to closed position at a point in the unwinding of said clock movement and means actuated by said valve actuating lever to release said clock for starting.

11. The control mechanism of claim 10 in which said transmission from said clock mechanism to said valve closing lever comprises a bimetallic strip on one element and a notched plate on the other to be engaged by said bimetallic plate in different positions of said transmission.

12. A control mechanism for absorption refrigerators which comprises a clock, an expansible bellows, a spring to wind said clock, means actuated by the expansion of said bellows to tension said spring, a fuel shut-off valve, a fuel control means tiltable past a dead center in one direction to close and in the other to release said fuel shut-off valve, an actuating lever to tilt said fuel control lever past dead center, and positioned to be tilted to fuel closing position by said clock and to fuel release position by said bellows.

13. The mechanism of claim 11 comprising a lever actuated by said bellows and a leaf spring on said actuating lever in the path of said bellows actuated lever through a limited part of the swing of said lever.

14. The mechanism of claim 12 comprising a tilting arm weighted to stop said clock and positioned to be moved by said fuel control means to clock release position when in fuel valve release position.

15. Control mechanism for absorption refrigerators which comprises a clock mechanism having a winding and unwinding shaft rotatable through a limited arc, an expansible thermal element, means actuated upon the contraction of said expansible thermal element to wind said shaft and upon expansion of said expansible thermal element to release said shaft, a fuel control valve and a transmission between said valve and said expansible thermal element to open said valve upon expansion of said element and between said valve and said shaft to be engaged and to close said valve upon unwinding of said shaft.

16. The control mechanism of claim 15 in which said transmission comprises an engaging element movable to adjust the point of engagement and of the closing of said valve.

17. The control mechanism of claim 15 in which said transmission comprises a driving member moved by said shaft and a driven member positioned to be engaged by said driving member at a set point in the movement of said driving member and moved to close said valve.

18. The control mechanism of claim 15 in which said transmission comprises a driving member moved by said shaft, a driven member having a surface to be engaged by said driving member and a stop on said driving member to engage said surface of said driven member, said stop being movable to adjust the position of engagement between said driving member and said driven member and said driven member being actuated to close said valve when moved by the unwinding of said clock.

19. The control mechanism of claim 18 in which the adjusting movement of said stop is thermally actuated.

20. Control mechanism for absorption refrigerators which comprises a clock mechanism having a winding and unwinding shaft rotatable through a limited arc, an expansible thermal element, a spring to wind said shaft and tensioned by the expansion of said expansible thermal element to permit the unwinding of said shaft and released by the contraction of said expansible thermal element to wind said shaft, a fuel control valve and a transmission between said valve and said expansible thermal element to open said valve upon expansion of said element and between said valve and said shaft to be engaged and close said shaft upon unwinding of said shaft.

21. The control mechanism of claim 20 in which said transmission comprises a tiltable and sliding element driven by said winding and unwinding shaft, a driven element positioned to be engaged by said sliding element to open and close said valve, and means to tilt said sliding element relative to said driven element to adjust the position of engagement therewith.

JACQUES G. MEJEAN.

REFERENCES CITED

The following references are of record in the file of this patent:

UNITED STATES PATENTS

| Number    | Name     | Date          |
|-----------|----------|---------------|
| 1,943,968 | Hulse    | Jan. 16, 1934 |
| 2,068,138 | Johnson  | Jan. 19, 1937 |
| 2,072,187 | Stickel  | Mar. 2, 1937  |
| 2,120,364 | Johnson  | June 14, 1938 |
| 2,256,121 | McCarthy | Sept. 16, 1941 |
| 2,280,961 | Lithgow  | Apr. 28, 1942 |